US005123808A

United States Patent [19]

Fath

[11] Patent Number: 5,123,808

[45] Date of Patent: Jun. 23, 1992

[54] APPARATUS FOR LOADING CONNECTORS INTO CONNECTOR APPLICATORS

[75] Inventor: Scott A. Fath, Glen Allen, Va.

[73] Assignee: AMP Incorporated, Harrisburg, Pa.

[21] Appl. No.: 662,547

[22] Filed: Feb. 28, 1991

Related U.S. Application Data

[63] Continuation-in-part of Ser. No. 647,107, Jan. 25, 1991.

[51] Int. Cl.[5] .......... B65G 47/06

[52] U.S. Cl. .......... 414/796.4; 29/749; 29/759; 414/782; 414/779

[58] Field of Search .......... 29/749, 753, 759; 414/778, 779, 782, 796.4

[56] References Cited

U.S. PATENT DOCUMENTS

| | | | |
|---|---|---|---|
| 4,561,178 | 12/1985 | van de Kerkhof | 29/749 |
| 4,636,126 | 1/1987 | Spotts | 414/782 X |
| 4,682,391 | 7/1987 | Hall, Jr. et al. | 29/33 M |
| 4,761,879 | 8/1988 | Anderson | 29/749 |
| 4,839,962 | 11/1988 | Long, Jr. | 29/749 |
| 4,870,752 | 10/1989 | Brown et al. | 29/866 |
| 4,903,403 | 2/1990 | Brown et al. | 29/749 X |

FOREIGN PATENT DOCUMENTS

| | | | |
|---|---|---|---|
| 48909 | 9/1989 | U.S.S.R. | 414/796.4 |

*Primary Examiner*—Carl E. Hall

[57] ABSTRACT

Connector loading apparatus which can be used with a cable-making machine comprises a support surface having a transfer mechanism thereon which comprises a transfer slide assembly that is reciprocable between a magazine containing a stack of connectors and a loading station. The slide assembly comprises a body portion and a connector holder which is pivoted to the body portion on an axis which extends transversely of the path of reciprocation. The support surface is discontinuous in the vicinity of the loading station so that the connector holder pivots through an angle of 90 degrees at the loading station under the influence of gravity and the connector is thereby reoriented and properly positioned for loading into the module or other connector receiving portion of the cable-making machine.

10 Claims, 10 Drawing Sheets

APPARATUS FOR LOADING CONNECTORS INTO CONNECTOR APPLICATORS

CROSS-REFERENCE TO CO-PENDING APPLICATION

This Application is a continuation-in-part of application Ser. No. 647,107 filed Jan. 25, 1991.

FIELD OF THE INVENTION

This invention relates to loading apparatus for loading articles such as electrical connectors onto machines such as cable-making machines or bench applicators for installing connectors on cables.

BACKGROUND OF THE INVENTION

An electrical connector of the type which has contact terminals having wire-receiving slots is usually installed on a multi-conductor cable by positioning the cable in alignment with the terminals in the connector and inserting the conductors in the cable into the wire-receiving slots in the terminal. A common type of connector has a body portion from which the wire-receiving portions of the terminals extend and a cover member which is above the ends of the wire-receiving portions. The cable is positioned between the cover and the free ends of the terminals and the cover is moved downwardly to push the conductors into the cable into the wire-receiving slots of the terminals. The operation is carried out by means of a press which may be a simple bench press or may be part of an integrated, fully automatic cable-making machine.

In the operation of a simple bench press, the operator must place a connector in the nest of the press which holds the connector during installation, position the cable in the press, actuate the press, and then remove the cable assembly with the connector installed thereon from the press. During each operating cycle of an automatic cable-making machine, a cable assembly is removed at the end of an operating cycle and connectors are then placed in the machine for the next operating cycle. In both cases, the steps of removing the connector which has been installed on a cable from the press and placing a replacement connector in the press is time consuming. In the case of a bench applicator, an operator will spend more time manipulating the connectors than in carrying out the actual installation process which merely requires that the press be actuated. In the case of a cable-making machine, manual placement of connectors in the machine for each operating cycle would significantly reduce the production rate of the machine. It is desirable, therefore, to have a fully automatic system for ejecting connectors from the press which have been installed on the cable and, at the same time, feeding a new connector into the press of the bench machine or the automatic cable-making machine. The present invention is directed to the achievement of an apparatus which fully automatically and rapidly removes a connector from a magazine containing a stack of connectors and inserts the connector removed from the stack into the nest or other receiving portions of an applicator or an automatic cable-making machine.

THE INVENTION

The invention comprises an article handling mechanism which receives an article, such as an electrical connector, at an article dispensing station and moves the article to an ejection station. The mechanism comprises a slide assembly, support means for supporting the slide assembly, and actuating means for reciprocating the slide assembly along a horizontal path. The dispensing station is proximate to one end of the path and the ejection station is proximate to the other end of the path. The slide assembly comprises a body portion and an article holder. The body portion has a leading end and the article holder is pivoted to the leading end on a horizontal axis which is perpendicular to the path of reciprocation. The article holder has an article-holding nest therein which extends across the article holder and parallel to the pivotal axis. The nest extends into one horizontal surface of the holder, which surface faces upwardly when the article holder is at the dispensing station. The support means extends from the dispensing station to a location adjacent to the ejection station and is discontinuous, or interrupted, at the unloading station so that the article holder will pivot downwardly under the influence of gravity when the leading end of the slide assembly moves into the ejection station. Article-retaining means are provided at the ejection station for retaining the article in the nest after pivoting of the article holder. The articles, such as electrical connectors, are loaded into the article holder when in one orientation and are rotated through an angle of 90 when they arrive at the dispensing station.

THE DRAWING FIGURES

FIG. 1 a perspective view of a typical electrical connector of a type which can be handled by a transferring mechanism in accordance with the invention.

Figure 9:
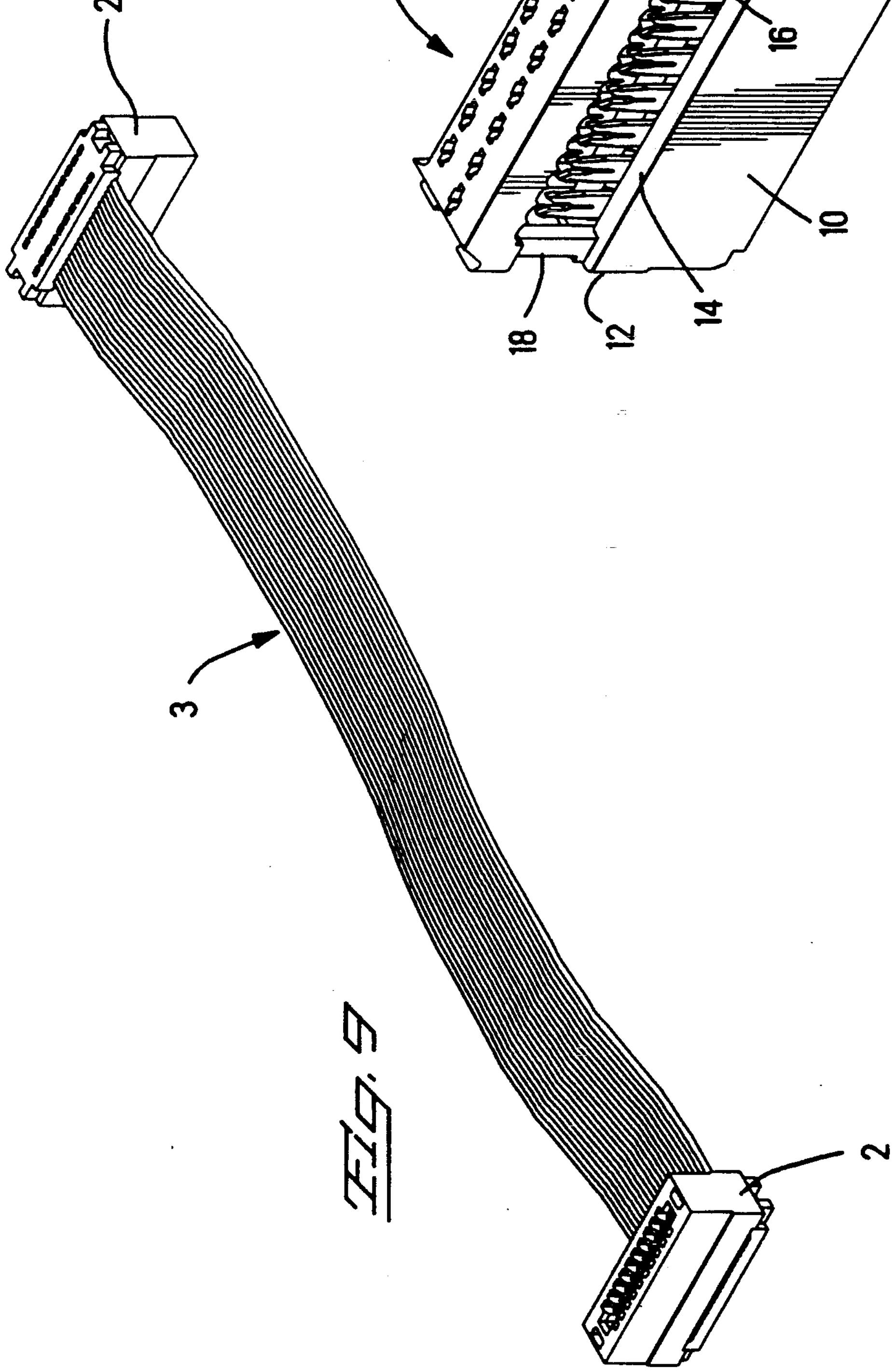
Figure 2:
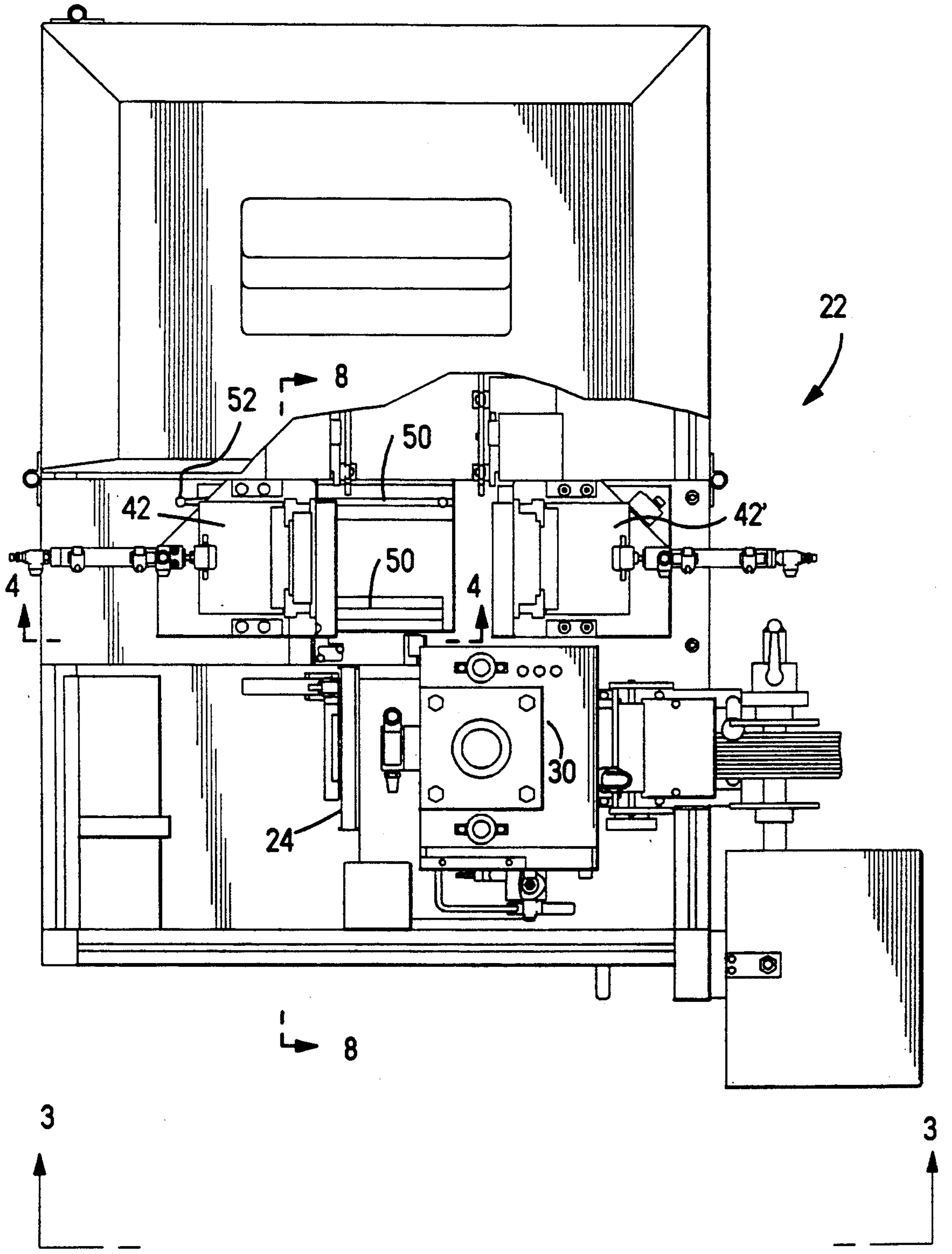
FIG. 2 is a top plan view of a cable-making machine.

FIG. 9 view of a cable assembly.

THE DISCLOSED EMBODIMENT

Figure 1:
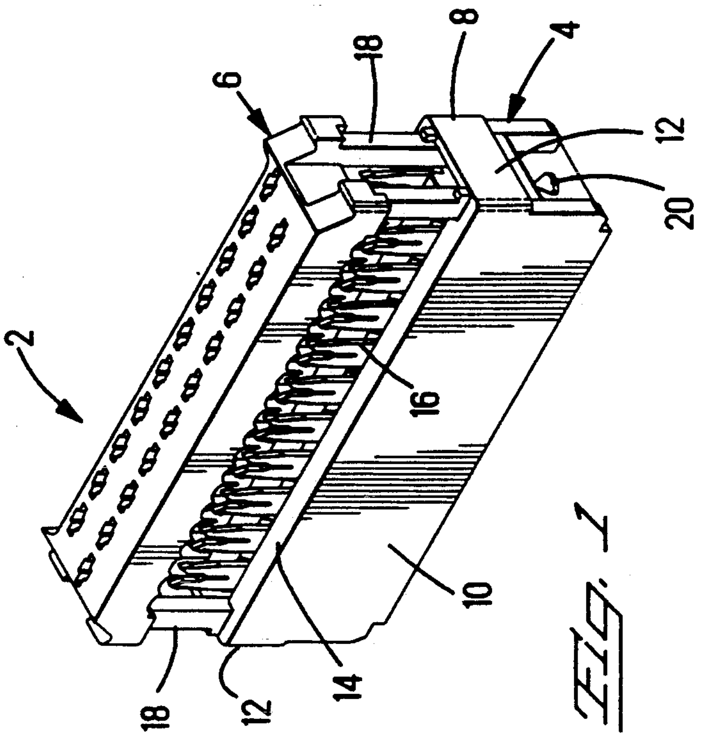

A typical electrical connector 2, FIG. 1, comprises a prismatic insulating body 4 and a cover 6. The body 4 has oppositely facing major side surfaces 8, 10 and oppositely facing ends 12. The upwardly facing surface 14 has the upper portions of electrical contact members 16 extending therefrom, these contact members having wire-receiving slots for receiving the individual conductors of a multi-conductor cable. The cover 4 has depending latch arms 18 at its ends which are captured in the body when the parts are in the positions of FIG. 1 prior to installation of the connector on a cable. When the connector is installed on the cable, the end portion of the cable is positioned between the upper ends of the contact members 16 and the downwardly facing surface of the cover. The cover 6 is then moved downwardly until the latch arms engage the latch ears 20 on the ends of the body portion and the conductors of the cable are thereby inserted into the wire-receiving slots of the terminals.

FIGS. 2, 3A, 3B, and 8 show a cable-making machine 22 of the general type described in application Ser. No. 647,107 having two transferring and loading mechanisms 42, 42' thereon. The machine will be described only briefly and to the extent necessary for an understanding of the function of the transferring mechanisms 42, 42' of the present invention in the operation of the cable-making machine.

Figure 3A:
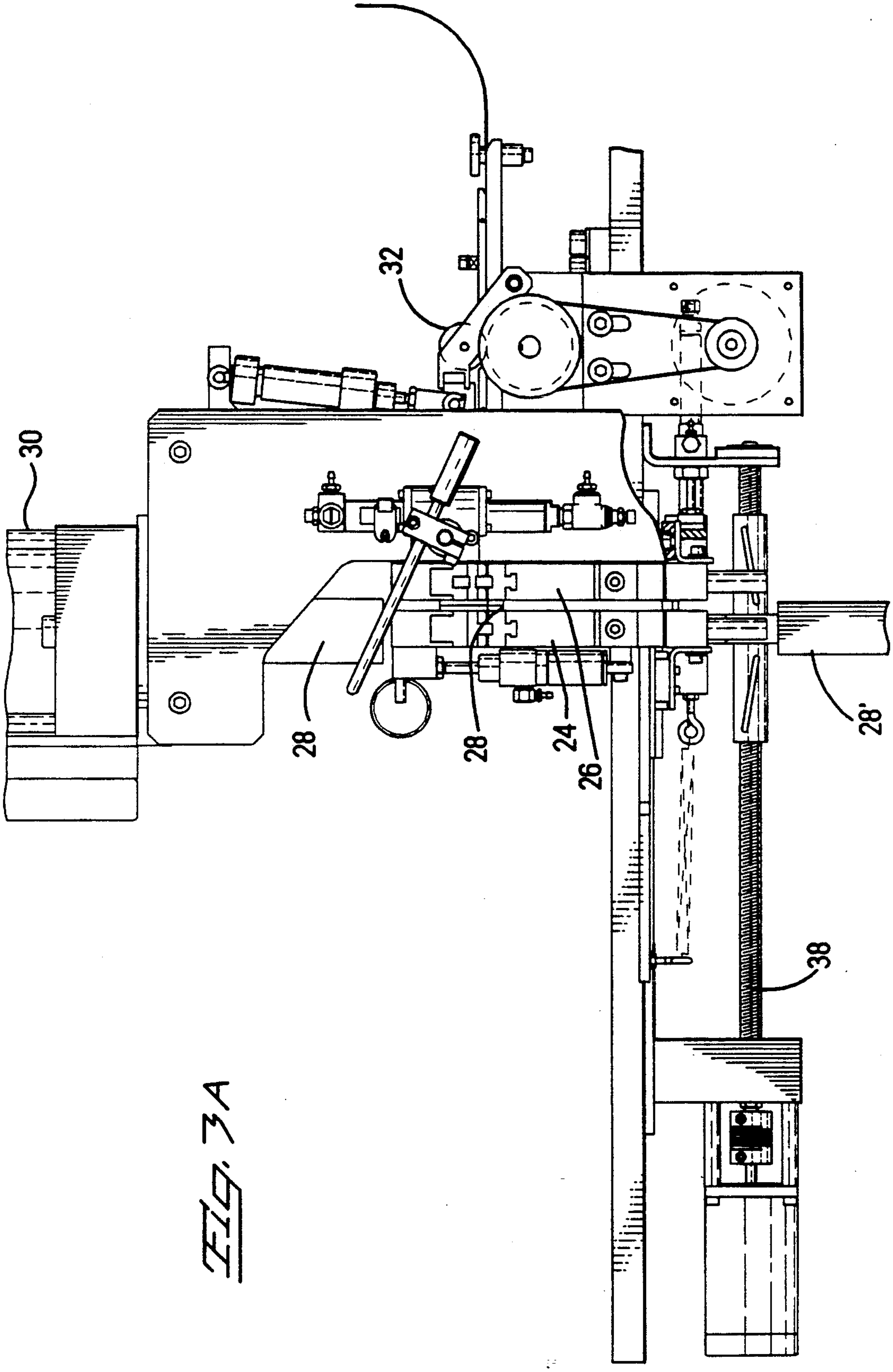
FIGS. 3A and 3B are side views looking in the direction of the of FIG. 2.
Figure 3B:
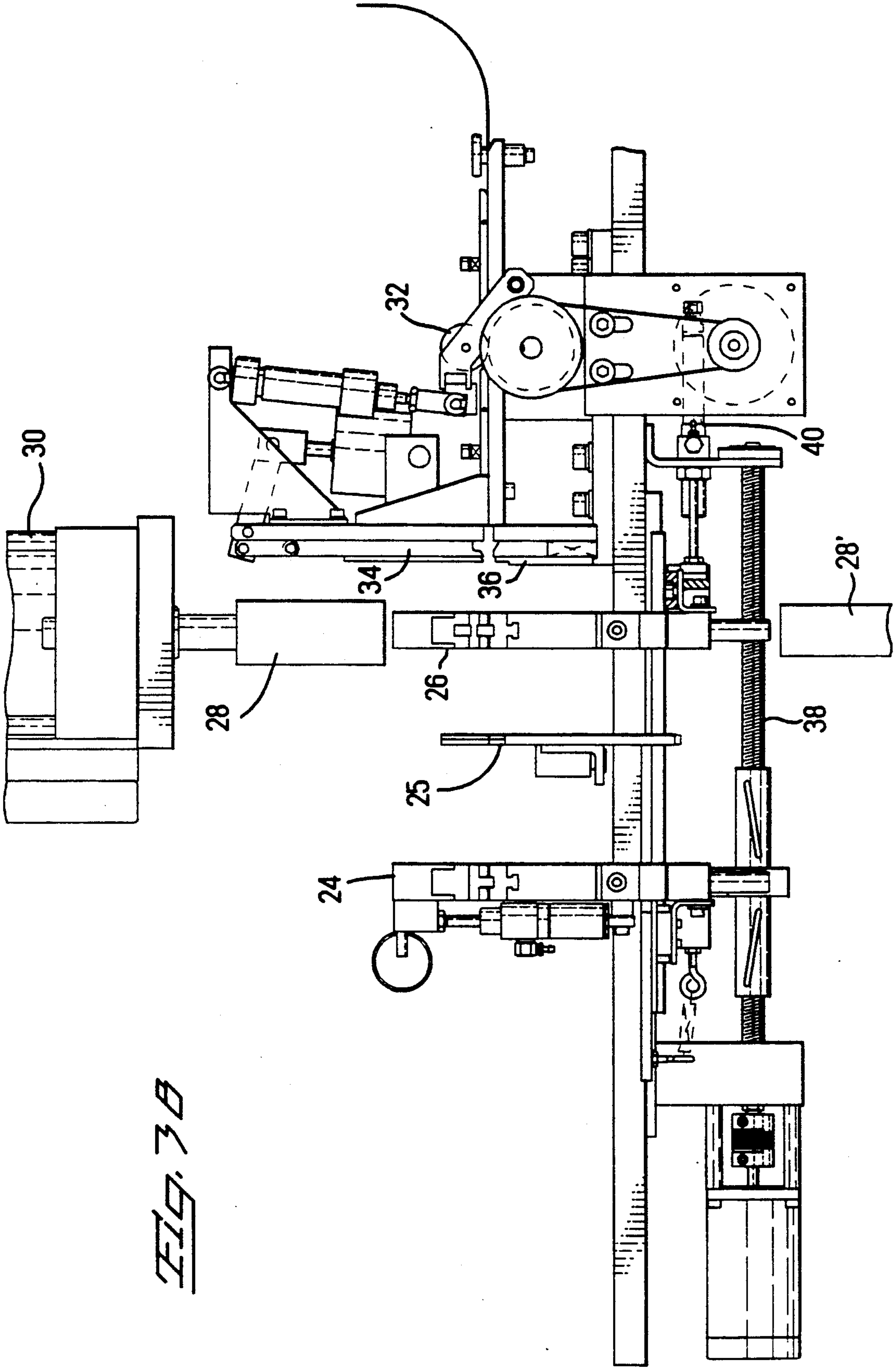

The cable-maker 22 has two connector-receiving modules 24, 26 which are movable horizontally between the positions shown in FIGS. 3A and 3B. Each module contains a connector of the type shown in FIG. 1 and the connectors are installed on cable 3 which is fed by feed rolls 32 along a cable feed path which extends past cable severing blades 34, 36 to the modules and to an installing station. The installing station comprises upper and lower press rams 28, 28' which are moved relatively towards each other and towards the module which is positioned in the installing station by means of a piston cylinder, one of which is shown at 30 in FIGS. 3A and 3B. The module 24 is moved horizontally by a power screw 38 which is rotated by a motor and the module 26 is moved from a location against the cable cutting blades 34, 36 to the installing station by a piston cylinder 40.

During an operating cycle, the module 26 will be against the blades 34, 36 at the beginning of the cycle and the module 24 will be located in the installing station, that is, between the rams 28, 28' (see FIG. 3A). The feed rolls 32 feed cable from an endless source past the blades 34, 36, through the module 26 and through the connector in the module 26 and to the connector in the module 24. The press rams 28, 28' are actuated to install the connector contained in module 24 on the cable, the module 24 is thereafter moved leftwardly to the position of FIG. 3B and the module 26 is moved to the installing station. The blades 34, 36 are then moved towards each other to cut the cable, the cable is pulled leftwardly, either by the module 24 or by a cable clamp 25 until the end of the cable is in the connector contained in the module 26. Thereafter, the rams 28, 28' are again moved towards each other to install the second connector on the trailing end of the cable.

The modules 24, 26 are constructed such that the completed cable assembly 3 can be ejected by being moved from the module and at the same time, connectors can be moved into the modules by the loading mechanisms 42, 42'. The loading mechanisms 42, 42' are substantial mirror images of each other and a description of the mechanism 42 will suffice for both.

The cable making machine 22 can be operated in several different modes, one of which requires that the clamp 25 be used to pull the cable from the cutting blades into the module 26 and another mode in which the module 24 pulls the cable. Reference is made to application Ser. No. 641,107 for a complete detailed explanation of the several operating modes of the machine.

Referring now to FIGS. 4–8, the loading apparatus 42 comprises a fixed support plate 44 which is adjustably supported by supporting means 46 above a frame plate 45 of the cable-making machine. The plate 44 is adjustable rightwardly and leftwardly as viewed in FIG. 4 by means of bearings which are supported on spaced-apart rails 50. Limited adjustment of this mechanism is required for the reason that the module 24 will not always be at the same position at the end of an operating cycle of the cable-making machine and the loading apparatus must be aligned with this module in order to load a connector into the module and eject the connector which was previously installed on a cable. A clamp 52 is provided to clamp the loader in a particular position of adjustment.

A slide assembly 56 is supported on the upper surface 54 of plate 44 and comprises a slide block 58 and a connector carrier 60. The slide block or body portion 58 is coupled by means of a coupling block 62 to a piston rod 64 which extends from a piston cylinder 66 which is also supported on the upper surface of plate 44. It will be apparent that pressurization of the cylinder 66 will cause rightward movement of the slide assembly 56 from the position shown in FIG. 4A to the position shown in FIG. 4B. The carrier 60 comprises a channel member 68 having an upwardly facing recess 70 which extends transversely of the path of reciprocation of the slide assembly. The width of this recess is substantially equal to the height of the connector so that the recess is dimensioned to receive a connector in an orientation such that the major side surfaces 8, 10 are in horizontal planes. Channel member 68 has an integral ear 72 which is received between arms 74 that extend from the body portion or slide block 58 and this ear is pivoted to these arms on pivotal axes 76. The right-hand end 78 of the plate 44 is curved downwardly and a groove 79 extends across the plate and receives a pin which extends from the underside of the slide block 58 to provide guidance for the coupling block and the slide assembly.

Figure 4A:
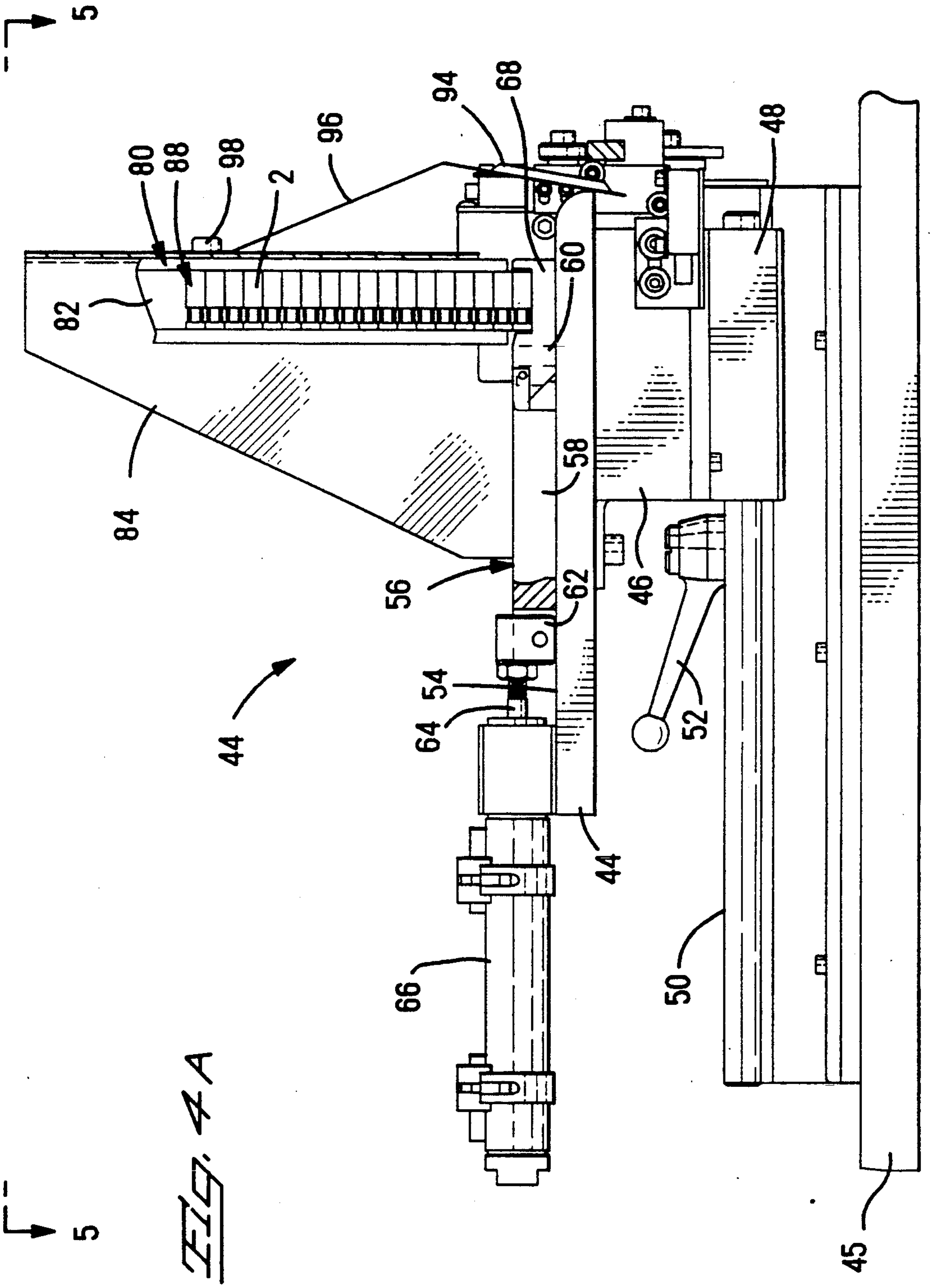
FIGS. 4A and 4B are side views of a loading and transferring mechanism in accordance with the invention looking in the direction of the arrows 4—4 of FIG. 2.

During continuous operation of the cable-making machine, connectors 2 are supplied from a magazine 80 mounted above the surface 54 of plate 44. This magazine comprises opposed channel-like members 82 which are spaced apart by a distance substantially equal to the distance between the ends 12 of the connectors. The channels are supported on a suitable bracket assembly 84 which has ears that are secured by fasteners 86 to the plate 44. The lower ends 90 of these channel members 82 are spaced above the upper surface 92 of the slide block 58 and above the upper surface of the connector carrier 60 when this carrier is in a horizontal position as shown in FIG. 4A. The connectors 2 are considered to be in a first orientation when they are stacked in the magazine as shown in FIG. 4A with the oppositely facing major side surfaces of the connectors 10 in parallel horizontal planes. After the connectors have been delivered to the delivery station, as shown in FIG. 4B, they are considered to be in a second orientation, that is in an orientation such that the major side surfaces 10 are in vertical planes.

At the beginning of an operating cycle, the slide assembly 56 will be in the position of FIG. 4A with the carrier beneath the stack 88 of connectors so that the lowermost connector of the stack will fall into the recess 70 in the upper surface of the connector carrier 60. The slide assembly 56 can then be moved rightwardly to the position of FIG. 4B and the remainder of the connectors in the stack will be supported by the upper surface 92 of the slide assembly. When the connector carrier 60, reaches the right-hand end 78 of the plate 44, it will pivot downwardly under the influence of gravity, and the connector contained in the carrier 60 will thereby be rotated through an angle of 90 degrees and will be in a proper position and orientation for movement into one of the modules of the cable-making machine. After the carrier pivots through an angle of 90 degrees, the connector contained in the channel of the carrier must be retained from falling out of the carrier and to this end, a sheet metal retaining surface 94 is provided which is on the end of a sheet metal plate 96 that is secured by fasteners 98 to the previously described bracket which supports the magazine channels 82.

Figure 4B:
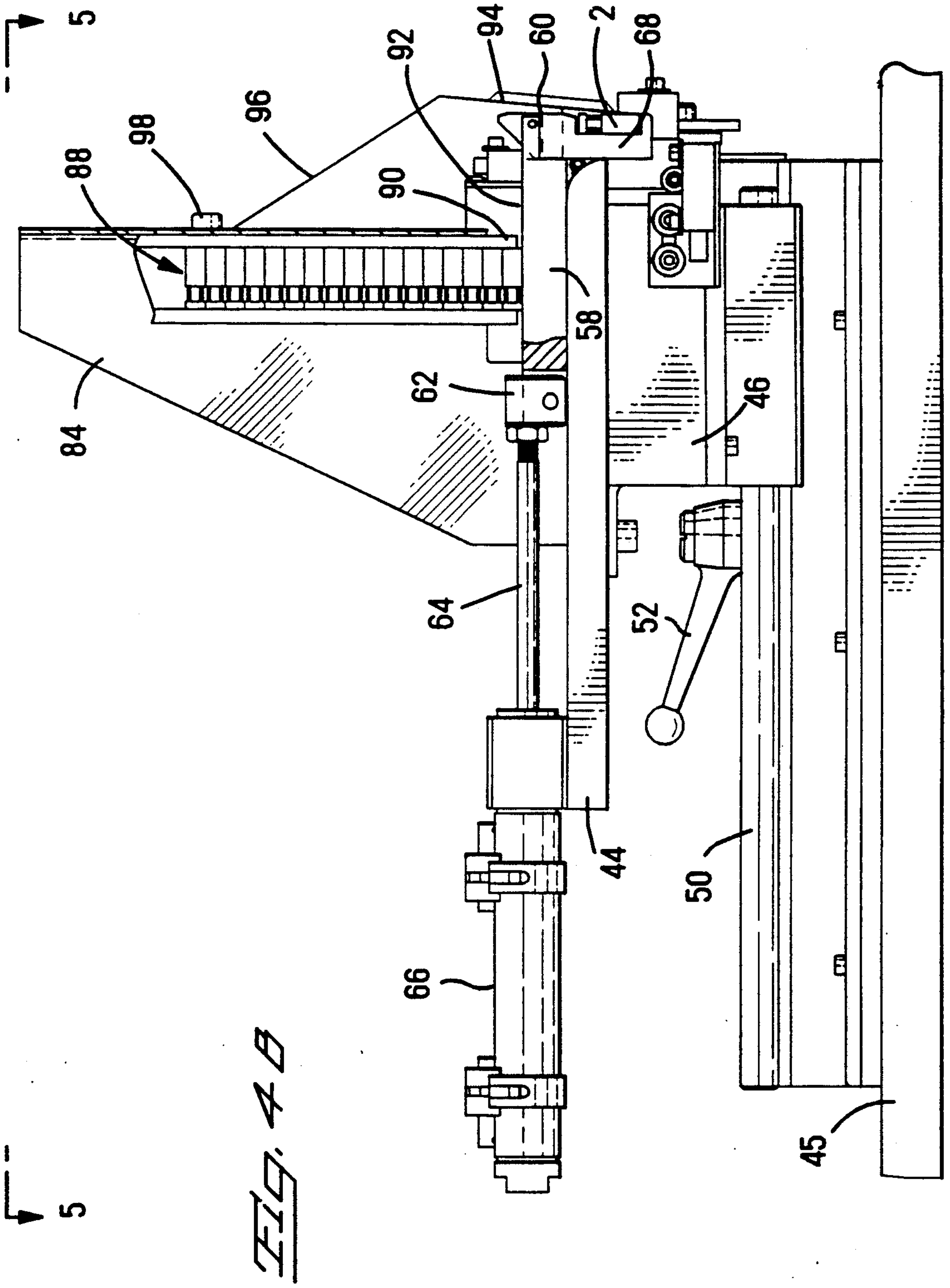
Figure 5:
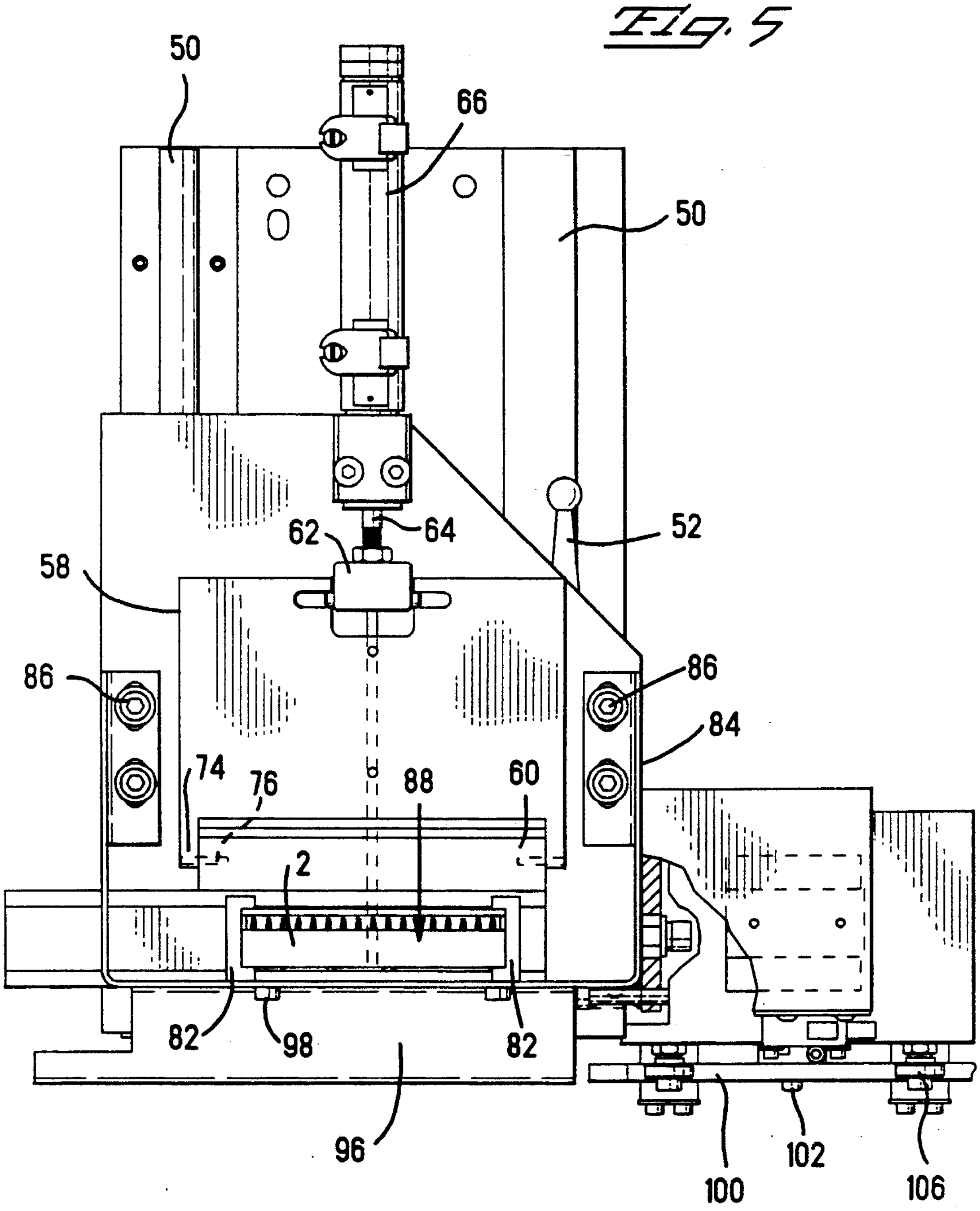
FIG. 5 is a top plan view of the apparatus of FIG. 4 looking in the direction of the arrows 5—5 of FIG. 4A.
Figure 6:
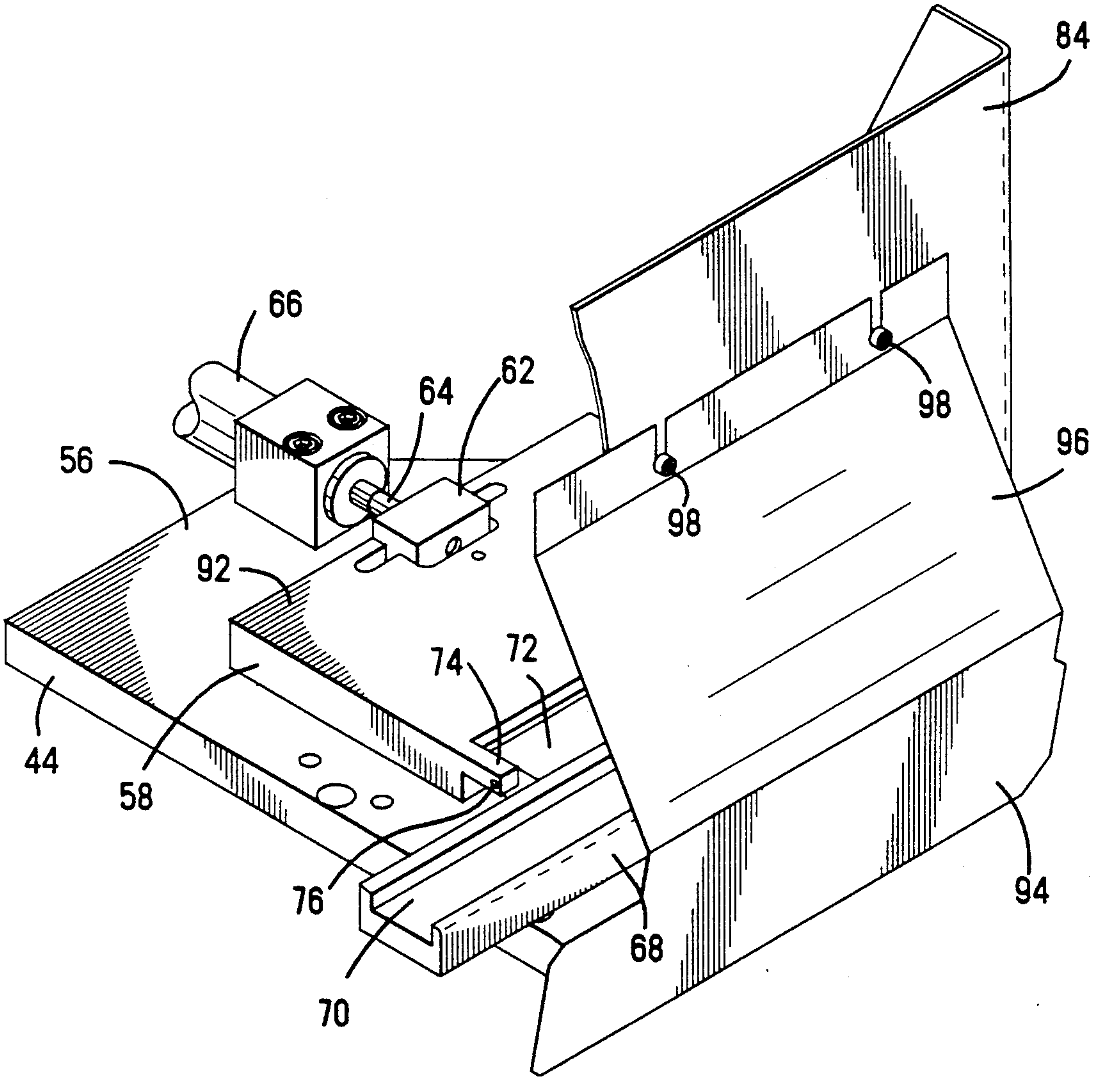
FIG. 6 is a perspective view of portions of the apparatus showing the transfer slide assembly.
Figure 7:
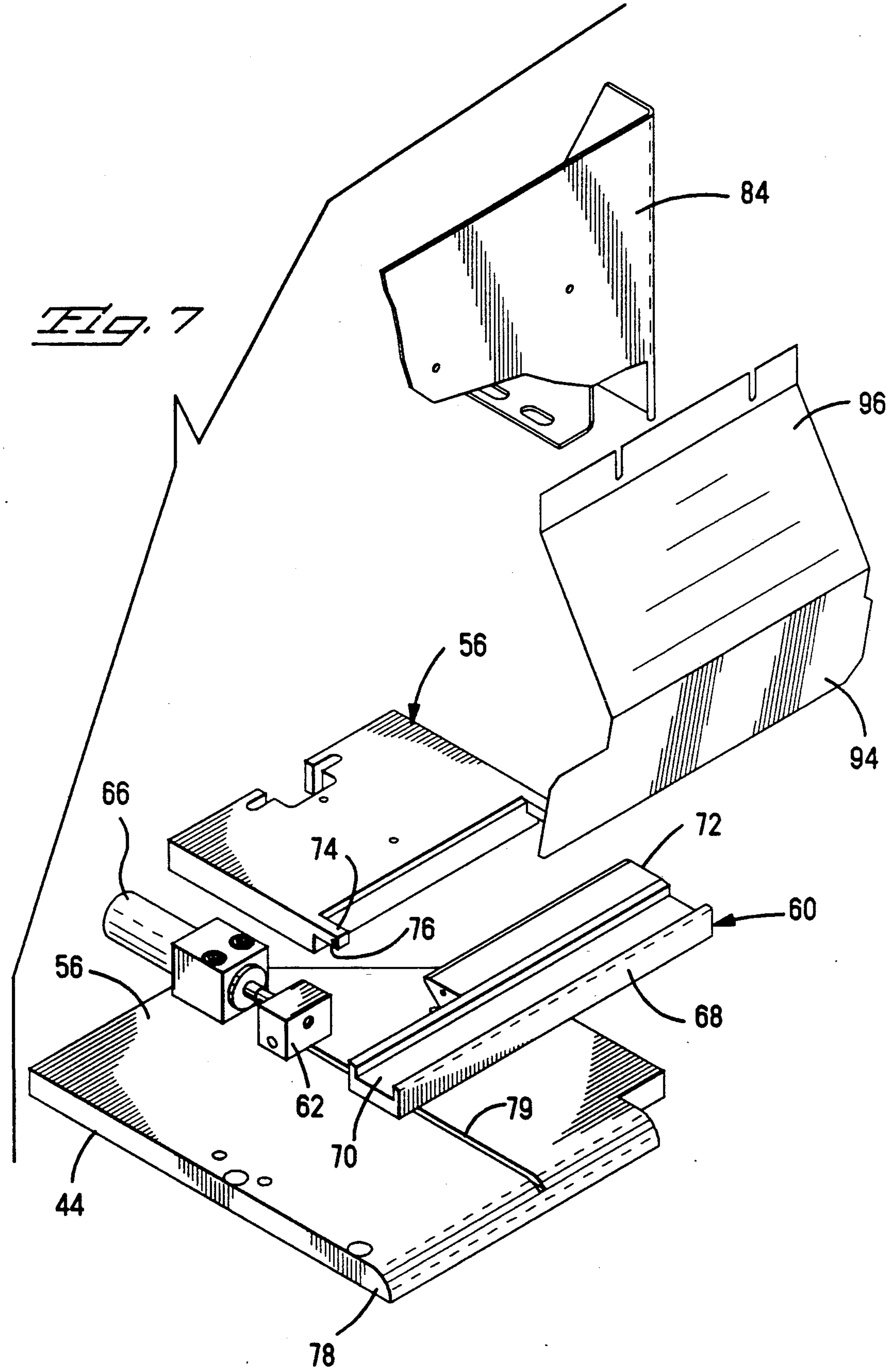
FIG. 7 is a view similar to FIG. 6 but showing the parts exploded from each other.
Figure 8:
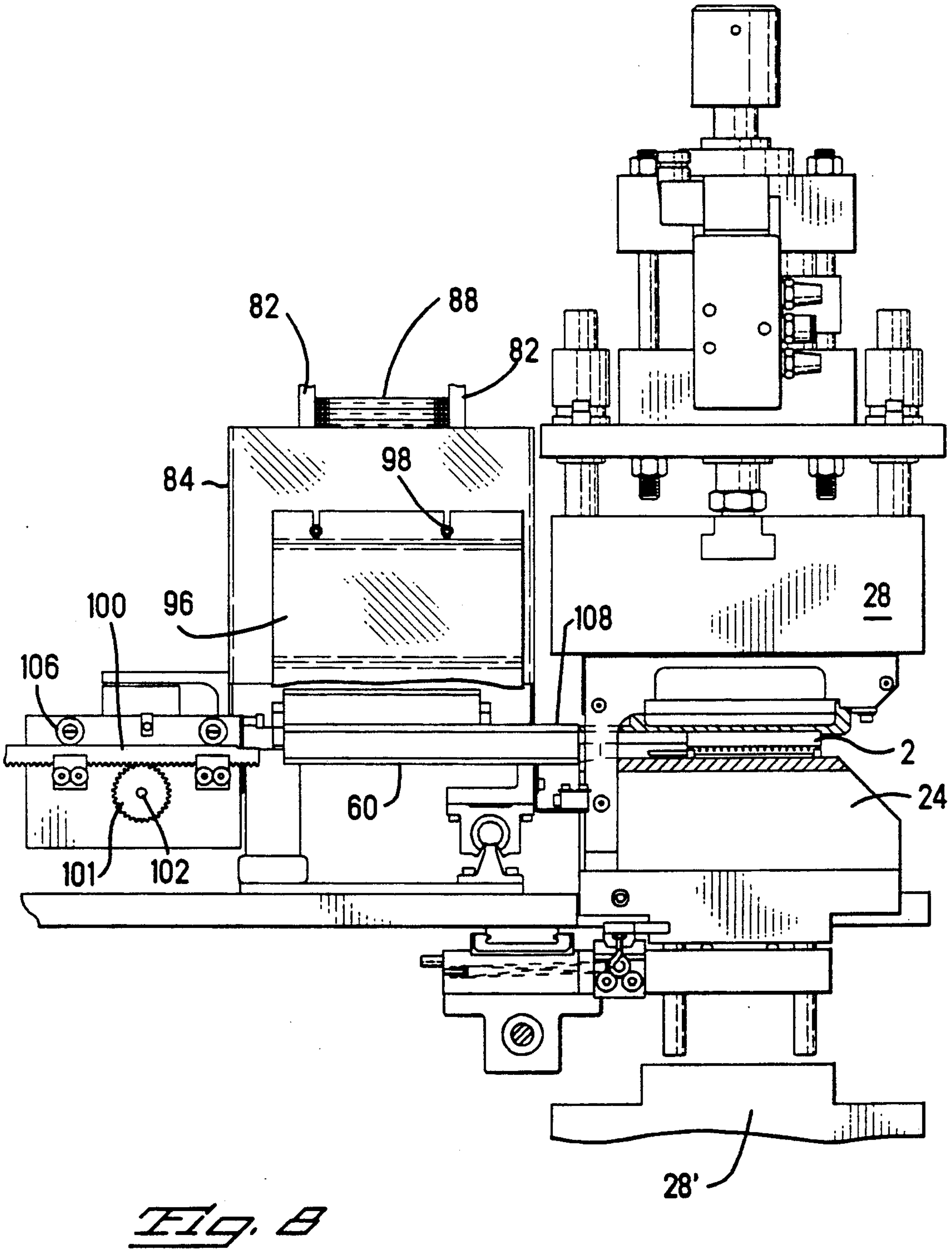
FIG. 8 is a view looking in the direction of the arrows 8—8 of FIG. 2.

When the parts are in the position of FIG. 4B, it is only necessary to push the connector which is contained in the carrier towards the module with which the carrier is aligned in order to load the connector into the module and, at the same time, eject the previously produced cable assembly from the machine. This movement of the connector is achieved by a rod 100 which is mounted on the left-hand side of the apparatus as viewed in FIG. 8. On its underside, rod 100 is provided with gear teeth which mesh with a gear wheel (101) on the end of the shaft 102 of a motor 104. Suitable guide rolls 106 are provided to insure that this rod will move horizontally along a straight line path and push the connector from the carrier and into the module. The channel portion 68 of the carrier extends leftwardly as viewed in FIG. 6 beyond the side edges of the support plate 44. This extension is necessary in order that the end of the carrier will be immediately adjacent to the module into which the connector is being loaded.

The loading mechanism 42' is fixed to a support surface of the machine since it is not necessary that this mechanism be adjustably mounted. The loading device 42 always loads connectors into the module 26 which is always at the installing station of the cable-making machine when a previously completed cable assembly is ejected and a fresh connector is inserted into the module.

It will be apparent from the foregoing that a transfer and loading mechanism in accordance with the invention can be used on a wide variety of connector applicators, whether bench-type applicators or applicators which are parts of a fully automatic cable-making machine. Individual connectors can, in a very short time, be taken from an inventory of connectors in the magazine and transferred to the unloading station. The connectors are stacked on their sides in the magazine 82, a stacking method which protects them against damage and which permits a relatively large number of connectors to be maintained in the stack. The connectors are reoriented when they arrive at the adjacent unloading station so that they are in proper positions for insertion into the machine.

I claim:

1. An article handling mechanism which receives an article at a dispensing station and moves the article to an ejection station at which it is ejected, the mechanism comprising:

a slide assembly, support means for supporting the slide assembly, and actuating means for reciprocating the slide assembly along a horizontal path, the dispensing station being proximate to one end of the path and the ejection station being proximate to the other end of the path, the slide assembly having a body portion and an article holder which is pivoted to the body portion on a horizontal pivot axis which is perpendicular to the directions of reciprocation, the article holder having a nest for holding the article, the support means having a horizontal support surface which supports the body portion and the article holder, the support surface extending along a portion of the path which extends from the dispensing station to a location adjacent to the ejection station, the support surface being discontinuous adjacent to the ejection station so that the article holder will pivot under the influence of gravity upon arrival at the ejection station, and dispensing means at the dispensing station for dispensing an article into the nest with the article in a first orientation whereby, an article loaded onto the article holder at the dispensing station will be transferred to the ejection station at which the article holder will pivot downwardly and the article will be rotated through an angle of 90° to a second orientation and the article can be unloaded in the second orientation.

2. A mechanism as set forth in claim 1 characterized in that the body portion of the slide assembly has a leading end, the article holder being pivoted to the leading end.

3. A mechanism as set forth in claim 2 characterized in that the article has a rectangular cross-section, the nest comprising a recess in the article holder which conforms to the cross-section of the article.

4. A mechanism as set forth in claim 2 characterized in that the article has a rectangular cross-section, the article holder has a horizontal upwardly facing surface and the nest comprises a recess which extends into the upwardly facing surface, across the article holder, and parallel to the pivot axis, the recess conforming to the cross-section of the article.

5. A mechanism as set forth in claim 4 characterized in that article retaining means are provided at the ejection station for retaining the article in the recess after pivoting of the article holder, and article ejecting means are provided at the ejection station for moving the article along an unloading path which extends laterally from, and is in alignment with, the recess.

6. A mechanism as set forth in claim 4 characterized in that a vertically extending magazine is provided at the dispensing station, the magazine containing a stack of articles in the first orientation, the article holder being beneath, and in alignment with, the magazine when the slide assembly is at the dispensing station whereby an article at the bottom of the stack will move into the recess.

7. Apparatus as set forth in claim 6 characterized in that the magazine comprises opposed channel members which are spaced apart by a distance equal to the width of the articles in the stack, the channel members having lower ends which are spaced from the support surface by a distance equal to the thickness of the article holder so that the article holder can move beneath the lower ends.

8. An electrical connector handling apparatus which receives an electrical connector which is in a first orientation at a dispensing station, moves the connector to an ejection station, rotates the connector through an angle of 90° to a second orientation, and ejects the connector at the ejection station, the apparatus comprising:

a reciprocable slide assembly, a horizontal support surface for supporting the slide assembly during reciprocation along a slide assembly path of reciprocation, and an ejector, the dispensing station being at one end of the path, the ejection station being at the other end of the path, the slide assembly comprising a body portion and a connector holder which is pivoted to the body portion on an axis which extends normally of the directions of reciprocation of the slide assembly, the article holder having a horizontal connector-receiving surface and a connector-receiving recess extending into the connector-receiving surface, the recess extending parallel to the axis and having open ends, the recess having a cross section which conforms to the cross section of the connector when the connector is in the first orientation, the support surface extending from the dispensing station to the ejection station and being discontinuous at the ejection station so that upon arrival of the slide assembly at the ejection station, the connector holder will pivot through an angle of 90° under the influence of gravity thereby rotating the connector in the recess through an angle of 90° to the second orientation, a vertically extending retainer at the ejection station, the retainer being against the connector receiving recess after the connector is pivoted through an angle of 90° thereby to retain the connector in the recess, and an ejector at the ejection station which is movable along an ejector path which is parallel to the axis and which extends through the recess thereby to push the connector form the recess.

9. An electrical connector handling apparatus as set forth in claim 8 characterized in that a vertically extending magazine is provided at the dispensing station, the magazine containing a stack of connectors in the first orientation, the connector holder being beneath, and in alignment with, the magazine when the slide assembly is at the dispensing station whereby a connector at the bottom of the stack will fall into the connector receiving recess.

10. An electrical connector handling apparatus as set forth in claim 9 characterized in that the magazine comprises opposed channel members which are spaced apart by a distance equal to the width of one of the connectors in the stack, the channel members having lower ends which are spaced from the support surface by a distance equal to the thickness of the connector holder so that the connector holder can move beneath the lower ends.

* * * * *